(12) United States Patent
Joseph et al.

(10) Patent No.: US 12,461,412 B2
(45) Date of Patent: Nov. 4, 2025

(54) DISPLAY APPARATUS AND MEANS OF TRANSPORTATION

(71) Applicant: Continental Automotive Technologies GmbH, Hannover (DE)

(72) Inventors: Manrico Joseph, Ober-Ramstadt (DE); Martin Jekel, Bad Nauheim (DE); Sait Kalender, Darmstadt (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/204,215

(22) Filed: May 31, 2023

(65) Prior Publication Data
US 2023/0393432 A1    Dec. 7, 2023

(30) Foreign Application Priority Data
Jun. 1, 2022    (DE) ...................... 10 2022 205 566.7

(51) Int. Cl.
*G02F 1/13357*    (2006.01)

(52) U.S. Cl.
CPC .. *G02F 1/133605* (2013.01); *G02F 1/133603* (2013.01); *G02F 1/133608* (2013.01)

(58) Field of Classification Search
CPC ......... G02F 1/133605; G02F 1/133608; G02F 1/133603; G02F 2203/60
See application file for complete search history.

(56) References Cited

U.S. PATENT DOCUMENTS

| | | |
|---|---|---|
| 8,950,884 B2 | 2/2015 | Stevens et al. |
| 10,969,628 B1* | 4/2021 | Zweigle ............ G02F 1/133608 |
| 2004/0095763 A1 | 5/2004 | Guerrieri et al. |
| 2005/0138852 A1 | 6/2005 | Yamauchi |
| 2005/0195619 A1 | 9/2005 | Tseng |
| 2005/0276069 A1 | 12/2005 | Taniguchi et al. |
| 2006/0138441 A1 | 6/2006 | Kromotis et al. |
| 2007/0069227 A1* | 3/2007 | Grotsch ................ F21K 99/00 |
| | | 257/E33.072 |
| 2008/0101062 A1 | 5/2008 | Feng et al. |
| 2008/0111471 A1 | 5/2008 | Blumel et al. |
| 2010/0033956 A1 | 2/2010 | Kirchberger et al. |

(Continued)

FOREIGN PATENT DOCUMENTS

| | | | | |
|---|---|---|---|---|
| CN | 103742840 A | | 4/2014 | |
| CN | 115016175 A | * | 9/2022 | ....... G02F 1/133605 |

(Continued)

OTHER PUBLICATIONS

Search English translation of JP-05139186-A (Year: 1993).*

(Continued)

*Primary Examiner* — Omar Rojas Cadima
(74) *Attorney, Agent, or Firm* — Buchanan Ingersoll & Rooney PC

(57) ABSTRACT

A display apparatus and a means of transportation having such a display apparatus is disclosed. The display apparatus has a display panel and a backlight for the display panel. The backlight has a reflector consisting of a plurality of modules with a plurality of reflectively configured cavities, and a plurality of light sources in each case arranged in the cavities. Provision is made between adjacent modules for a possible thermal expansion of the modules.

8 Claims, 8 Drawing Sheets

(56) References Cited

U.S. PATENT DOCUMENTS

| | | |
|---|---|---|
| 2010/0141867 A1 | 6/2010 | Ogihara et al. |
| 2011/0090671 A1 | 4/2011 | Bertram et al. |
| 2012/0153317 A1 | 6/2012 | Emerson et al. |
| 2013/0148035 A1 | 6/2013 | Shimizu |
| 2013/0148036 A1 | 6/2013 | Shimizu |
| 2013/0301264 A1 | 11/2013 | Van Gompel |
| 2018/0372300 A1 | 12/2018 | Ohkawa |
| 2020/0285117 A1 | 9/2020 | Hashimoto et al. |
| 2022/0252938 A1* | 8/2022 | Lo .................. G02F 1/133603 |
| 2022/0308272 A1 | 9/2022 | Hashimoto et al. |
| 2024/0045265 A1 | 2/2024 | Streppel |
| 2024/0125457 A1 | 4/2024 | Beng et al. |

FOREIGN PATENT DOCUMENTS

| | | | |
|---|---|---|---|
| DE | 10245945 A1 | | 4/2004 |
| DE | 10324909 A1 | | 1/2005 |
| DE | 102007007353 A1 | | 8/2008 |
| DE | 102008031987 A1 | | 4/2010 |
| EP | 1496488 A1 | | 1/2005 |
| EP | 1586814 A2 | | 10/2005 |
| EP | 3276406 A1 | | 1/2018 |
| EP | 4063945 A1 | | 9/2022 |
| JP | 05139186 A | * | 6/1993 |
| JP | H08123340 A | | 5/1996 |
| JP | 2001085748 A | | 3/2001 |
| JP | 2010272448 A | | 12/2010 |
| JP | 2016066085 A | | 4/2016 |
| JP | 2019197093 A | | 11/2019 |
| JP | 2021057505 A | | 4/2021 |
| KR | 20170061535 A | | 6/2017 |
| WO | 2014166991 A1 | | 10/2014 |
| WO | 2021221905 A1 | | 11/2021 |

OTHER PUBLICATIONS

Office Action dated Jan. 20, 2023 from corresponding German patent application No. 10 2022 205 566.7.

Search Report dated Nov. 3, 2023 from corresponding European patent application No. 23170179.8.

Office Action dated Jan. 17, 2023 from related German patent application No. 10 2022 205 568.3.

Search Report dated Oct. 27, 2023 from related European patent application No. 23170170.7.

Non-Final Office Action dated Feb. 28, 2024 from related U.S. Appl. No. 18/204,240.

Non-Final Office Action mailed Mar. 20, 2025 from related U.S. Appl. No. 18/204,240.

Notice of Allowance issued by the U.S. Patent and Trademark Office in the U.S. Appl. No. 18/204,240, mailed Jul. 31, 2025, U.S. Patent and Trademark Office, Alexandria, VA. (8 pages).

* cited by examiner

DISPLAY APPARATUS AND MEANS OF TRANSPORTATION

CROSS REFERENCE TO RELATED APPLICATIONS

This U.S. patent application claims the benefit of German patent application No. 10 2022 205 566.7, filed Jun. 1, 2022, which is hereby incorporated by reference.

TECHNICAL FIELD

The present disclosure relates to a display apparatus and to a means of transportation having such a display apparatus.

BACKGROUND

The number and area of display apparatuses in means of transportation are constantly increasing. Display apparatuses may be found on the market for example as an instrument cluster for the driver, as a central display, and also as a front-seat passenger display. Non-luminous transmissive display apparatuses require a backlight to present images. The task of the backlight is here to illuminate the display panel used as uniformly as possible over the entire active surface in order to produce a display that is as homogeneous as possible right up to the peripheral region.

Matrix backlights utilize a plurality of light sources arranged in a matrix for light generation. The light from the light sources is steered here in the direction of the display panel by means of a reflector.

For example, US 2005/0276069 A1 describes a liquid crystal display with a diffusion plate or a prism plate arranged between a liquid crystal panel and a plurality of light emission sections. Each light emission section is formed by an optical guide and one or more light-emitting apparatuses. The optical guide has a light reflection surface formed in a substrate and a light transmission surface that is brought into close contact with the light reflection surface.

DE 10 2007 007 353 A1 describes an illumination device having a light emission surface that is able to be assembled in a modular manner from a plurality of radiation reflectors. Radiation reflectors in the shape of honeycombs, scales, triangles or rectangles are preferably used. Each of the radiation reflectors has a plurality of radiation-reflecting surfaces that are outwardly curved starting from a center in which a light source is arranged.

As the size of the display apparatuses increases, so does the size of the reflectors required. This makes production and manageability of the reflectors more difficult. In addition, the thermal expansion of the reflectors during operation negatively affects the optical performance.

It is an object of the disclosure to provide an improved display apparatus with a matrix backlight.

SUMMARY

According to a first aspect of the disclosure, a display apparatus has a display panel and a backlight for the display panel, wherein the backlight has a reflector consisting of a plurality of modules with a plurality of reflectively configured cavities, wherein provision is made between adjacent modules for a possible thermal expansion of the modules; and a plurality of light sources arranged in each case in the cavities.

In the solution according to the disclosure, the reflector arranged between the light sources and the display panel has a modular design. The individual modules each have a circuit board with light sources arranged thereon and a reflector element. The reflector element preferably consists of plastic or an elastomer, for example of polycarbonate to which titanium dioxide was added for the desired reflectivity. Between the adjacent modules, measures were taken to enable compensation for thermal expansion during operation. These measures may moreover serve to compensate for any tolerances of the modules. The use of modules has the advantage here that the reflector is assembled from smaller elements that are easier to produce and to manage. In particular, the tolerances are smaller. The production tools required are also smaller, and so the tools may be manufactured faster and the pool of producers capable of the production is larger. In addition, there is the possibility of utilizing the modules for differently embodied display apparatuses, which is not, as a rule, possible in a reflector that is formed in one piece.

The reflectively configured cavities orient the light emerging from the light sources toward the display panel, so that homogeneous lighting of the display panel is achieved. The cavities may form, for example, a rectangular grid or a hexagonal grid. Both the arrangement of the cavities in a rectangular grid and also the arrangement of the cavities in a hexagonal grid allow the reflector to be formed from a gapless matrix of cavities.

According to one aspect of the disclosure, a free space is disposed between adjacent modules. The free space permits expansion of the modules without the adjacent modules coming into contact and causing stresses and deformations. For example a gap having a width of ~0.3 mm may be provided between the modules.

According to one aspect of the disclosure, an elastic connecting element is disposed between adjacent modules. Just like a free space, an elastic connecting element, for example made of rubber, also prevents the occurrence of stresses and resulting deformations of the modules. At the same time, an elastic connecting element of this type prevents any undesired passage of light.

According to one aspect of the disclosure, a compensation element is arranged between adjacent modules. The compensation element preferably consists of only one reflector element, that is to say it has neither a circuit board nor light sources. The reflector element is preferably designed here such that it complements the reflector elements of the adjacent modules. The use of a compensation element prevents the formation of unlit regions due to a temperature-related shortening of the modules.

According to one aspect of the disclosure, adjacent modules are configured such that they overlap. The overlap may exist directly between the reflector elements of the adjacent modules and also between the respective reflector elements and an interposed compensation element.

According to one aspect of the disclosure, the modules are connected to a carrier element by snapping, screwing, adhesive bonding or riveting. Various approaches may be used for the attachment of the modules to a carrier element. In addition to a connection by snapping or screwing, bonding by means of a liquid adhesive or adhesive strips is possible. Alternatively, the modules may be riveted together, for example by hot riveting. For this purpose, the reflector may provide suitable rivets, if required. The type of attachment used is at the discretion of a relevant person skilled in the art. Said approaches may self-evidently also be combined with one another.

According to one aspect of the disclosure, at least one of the modules has at least one energy-absorbing supporting element. Additional supporting elements prevent the display panel or the cover glass from breaking. The use of supporting elements allows the use of different materials for the supporting elements and the reflector. For example, the supporting elements may be made from polycarbonate or polymethyl methacrylate.

According to one aspect of the disclosure, walls of the cavities are rounded and the cavities are designed to reflect the light emitted by the light sources toward the display panel. By rounding the cavities, the emitted light may be reflected toward the display panel in a more targeted manner. The light sources are in this case preferably side-emitting light-emitting diodes, in particular light-emitting diodes that emit light on all sides. The use of side-emitting light-emitting diodes has the advantage that the formation of light spots in the backlight is prevented. This ensures illumination of the display panel that appears particularly homogeneous.

According to one aspect of the disclosure, the light sources arranged in the cavities of one module lie in one plane, and the arrangement of circuit boards and modules is adapted to a curvature of the display panel. The arrangement of the light sources in one plane allows the light sources to be mounted on a customary planar circuit board. In order to nevertheless achieve homogeneous lighting of a curved display panel, adjacent circuit boards are arranged such that they are tilted in relation to one another. Furthermore, the peripheral region of a module is correspondingly adapted.

A display apparatus according to the disclosure is preferably used in a means of transportation. The means of transportation may be, for example, a motor vehicle but alternatively also an aircraft, a rail vehicle, or a watercraft.

Further features of the present disclosure will be evident from the following description and the appended claims in conjunction with the figures.

DETAILED DESCRIPTION

For a better understanding of the principles of the present disclosure, embodiments of the disclosure will be explained in more detail below with the aid of the figures. The same reference signs are used for identical or functionally identical elements in the figures and are not necessarily described again for each figure. It is understood that the invention is not limited to the illustrated embodiments and that the described features may also be combined or modified without departing from the scope of protection of the disclosure as defined in the appended claims.

Figure 1:
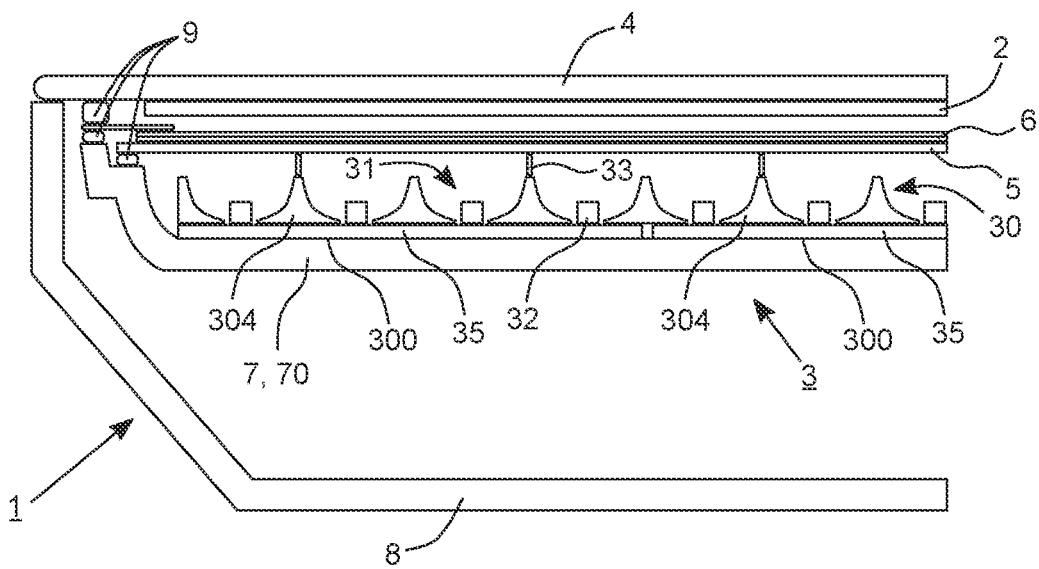
FIG. 1 schematically shows a section of a display apparatus according to the disclosure.

FIG. 1 schematically shows a section of a display apparatus 1 according to the disclosure. The display apparatus 1 has a display panel 2, which is adhesively bonded to a cover glass 4. The cover glass 4 closes off a housing 8 of the display apparatus 1 with respect to the environment. In a further housing 7, a backlight 3 for the display panel 2 is arranged. The housing 7 serves as a carrier element 70 for the backlight 3. The backlight 3 has a reflector 30 with a plurality of cavities 31. In each case one light source 32, typically a light-emitting diode, is located in the cavities 31. Optional additional supporting elements 33 prevent the display panel 2 or the cover glass 4 from breaking in the case of a head impact. In the illustrated example, an optical plate 5 with a film stack 6 that is arranged thereon is located between the backlight 3 and the display panel 2. The films of the optical film stack 6 are intended to scatter, collect or direct the light from the reflector 30 in a way such that the requirements regarding the solid angles of the backlight 3 are met. Typical films for directing light are brightness enhancement films (BEF) and light control films (LCF). The optical plate 5 is a transparent plate that safeguards the optical path length between the optical film stack 6 and the light sources 32. The cover glass 4, the optical plate 5, and the housing 7 of the backlight 3 are connected to one another by suitable connecting elements 9, for example adhesive bonds. The reflector 30 consists of a plurality of modules 300, which each have a circuit board 35 with the light sources 32 arranged thereon and a reflector element 304.

Figure 2:
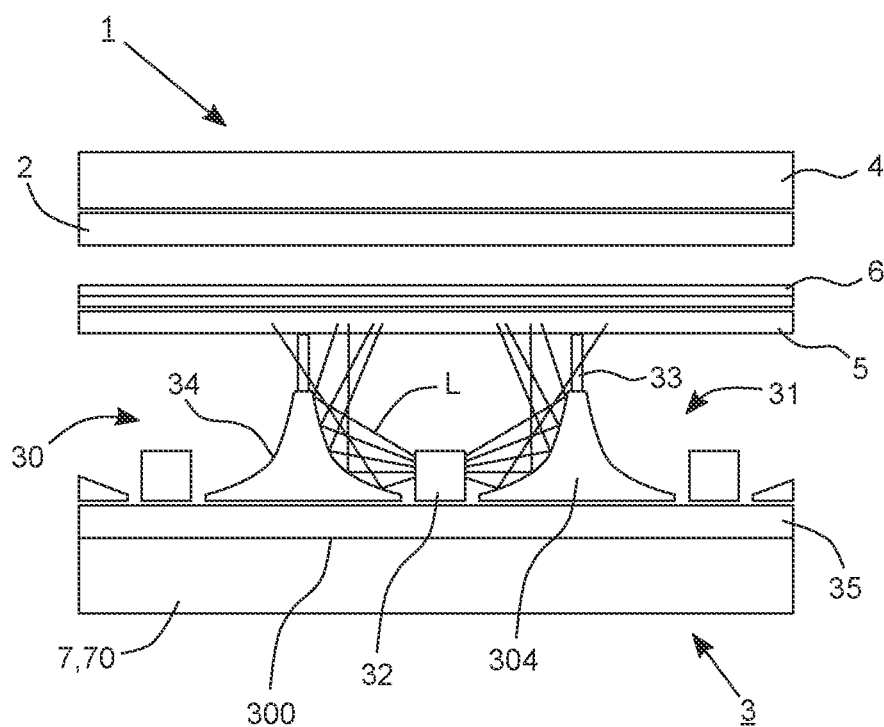
FIG. 2 schematically shows a detailed view of a display apparatus according to the disclosure.

FIG. 2 schematically shows a detailed view of a display apparatus 1 according to the disclosure. It shows the cover glass 4 with the display panel 2, the optical plate 5 with the film stack 6, and the backlight 3 with the housing 7, the circuit board 35 with the light sources 32 arranged thereon and the reflector 30. The light sources 32 in this case are side-emitting light-emitting diodes, which preferably emit light L on all sides. The reflectively configured walls 34 of the cavities 31 of the reflector have a rounded design and orient the light L emerging from the light sources 32 toward the display panel 2. The transparent supporting elements 33 allow the light L to pass through unimpeded, save for a refraction that is not shown in FIG. 2. Suitable materials for the supporting elements 33 are polycarbonate or polymethyl methacrylate, for example. In one exemplary configuration, the entire construction height of the display apparatus 1 preferably lies in the region of ~13.3 mm. The height of the reflector may be ~3.72 mm, the width of the walls 34 at their widest point may be ~6.13 mm. The distance between the film stack 6 and the display panel 2 is ~1.31 mm; the distance between the reflector 30 and the optical plate 5 is ~1.05 mm. The distance between the light sources 32 may be ~9.13 mm, for example.

Figure 3:
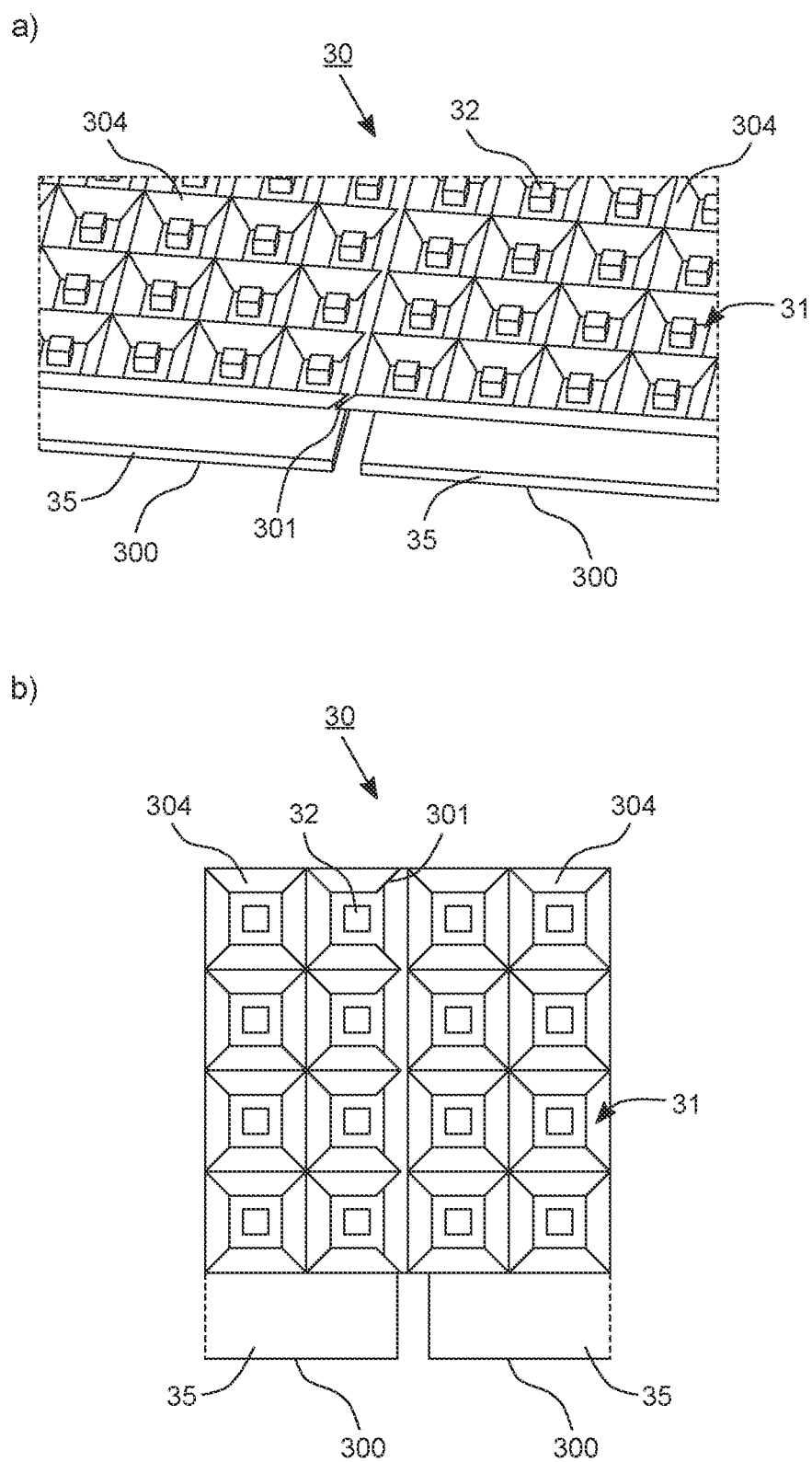
FIG. 3 schematically shows a first embodiment of a modular reflector.

FIG. 3 schematically shows a first embodiment of a modular reflector FIG. 3a) here shows an oblique view of two modules 300 of the reflector 30. FIG. 3b) shows a top view. Each of the modules has a circuit board 35 with light sources 32 arranged thereon and a reflector element 304 with cavities 31. The two modules 300 or the reflector elements 304 of the modules 300 are configured such that they overlap so that the reflector elements 304 complement one another.

Between the modules 300 there is a free space 301. The free space 301 permits expansion of the modules 300 without the adjacent modules 300 or reflector elements 304 coming into contact and causing stresses and deformations. For example a gap having a width of ~0.3 mm may be provided as the free space 301.

Figure 4:
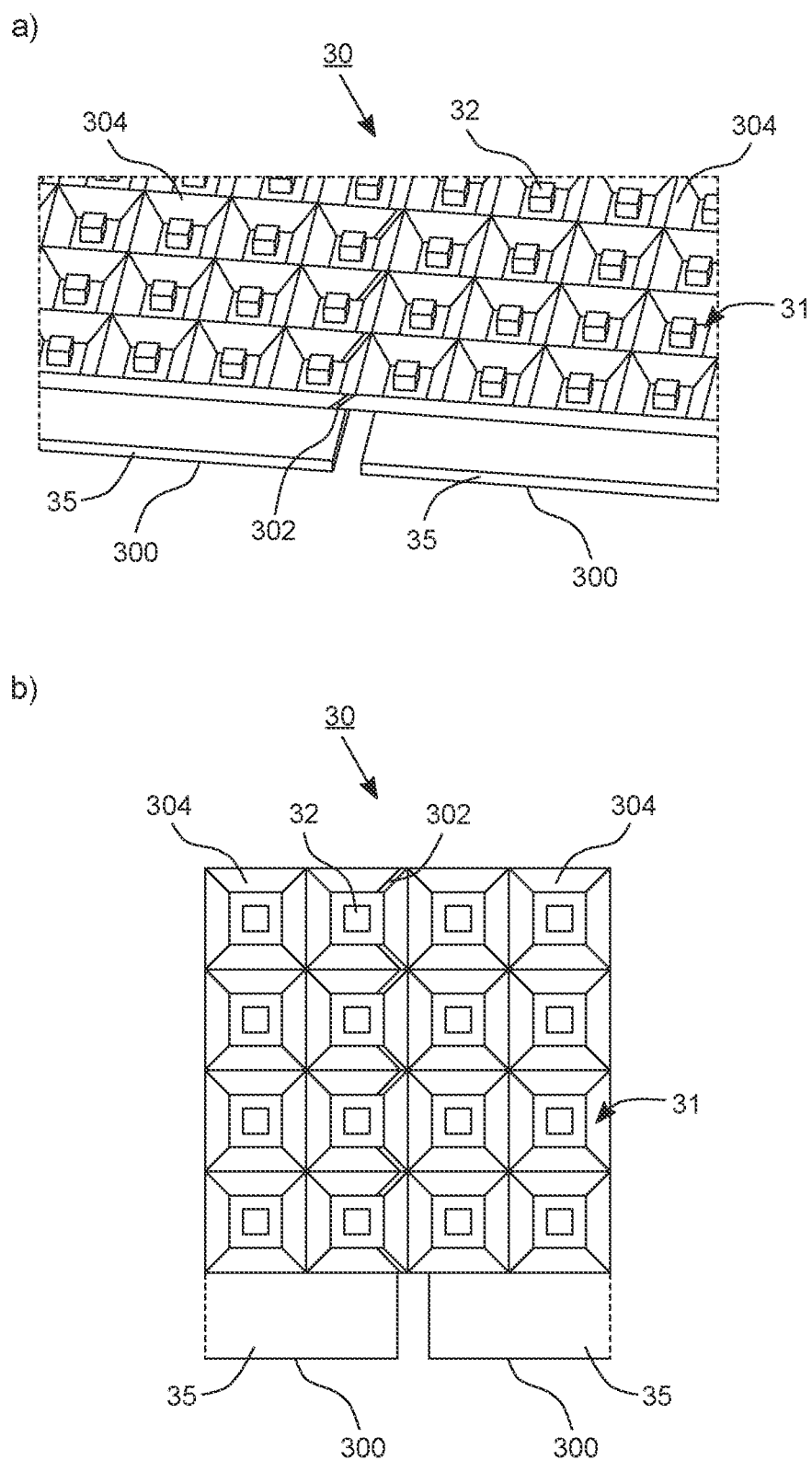
FIG. 4 schematically shows a second embodiment of a modular reflector.

FIG. 4 schematically shows a second embodiment of a modular reflector 30. FIG. 4a) here shows an oblique view of two modules 300 of the reflector 30. FIG. 4b) shows a top view. This embodiment of the modular reflector largely corresponds to the embodiment in FIG. 3. However, in this case there is an elastic connecting element 302, for example made from rubber, between the modules 300. An elastic connecting element 302 is also suitable for preventing the occurrence of stresses and resulting deformations of the modules 300 or reflector elements 304. At the same time, an elastic connecting element 302 of this type prevents any undesired light from passing through at the transitions between the reflector elements 304.

Figure 5:
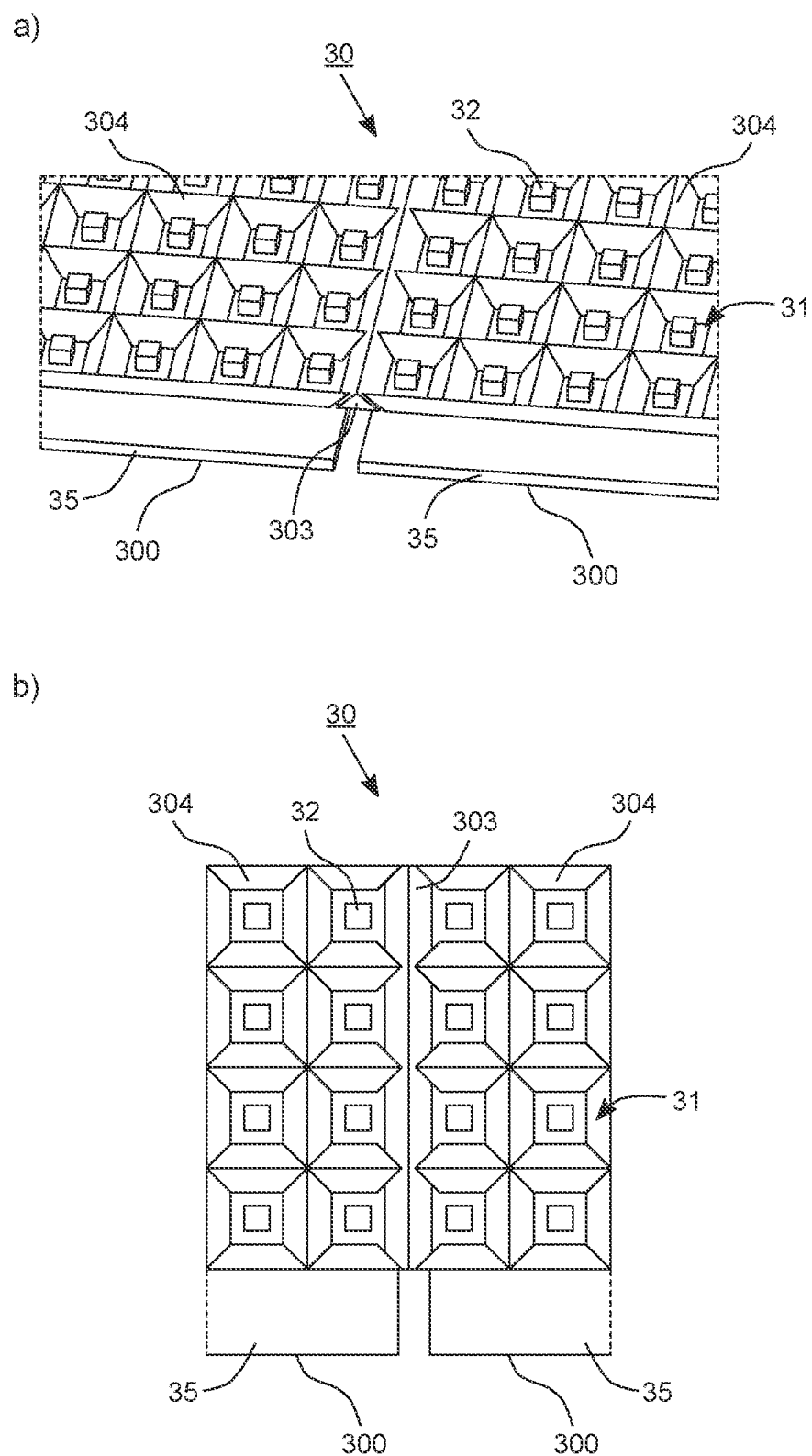
FIG. 5 schematically shows a third embodiment of a modular reflector.

FIG. 5 schematically shows a third embodiment of a modular reflector 30. FIG. 5a) here shows an oblique view of two modules 300 of the reflector 30. FIG. 5b) shows a top view. In this embodiment, a compensation element 303 is arranged between the reflector elements 304 of the adjacent modules 300. In the example shown, the compensation element 303 consists of only one reflector element 304 in the form of a wall 34 of the cavities 31, i.e., it has neither a circuit board nor light sources. The reflector element 303 is designed in FIG. 5 such that it complements the reflector elements 304 of the adjacent modules 300.

Figure 6:
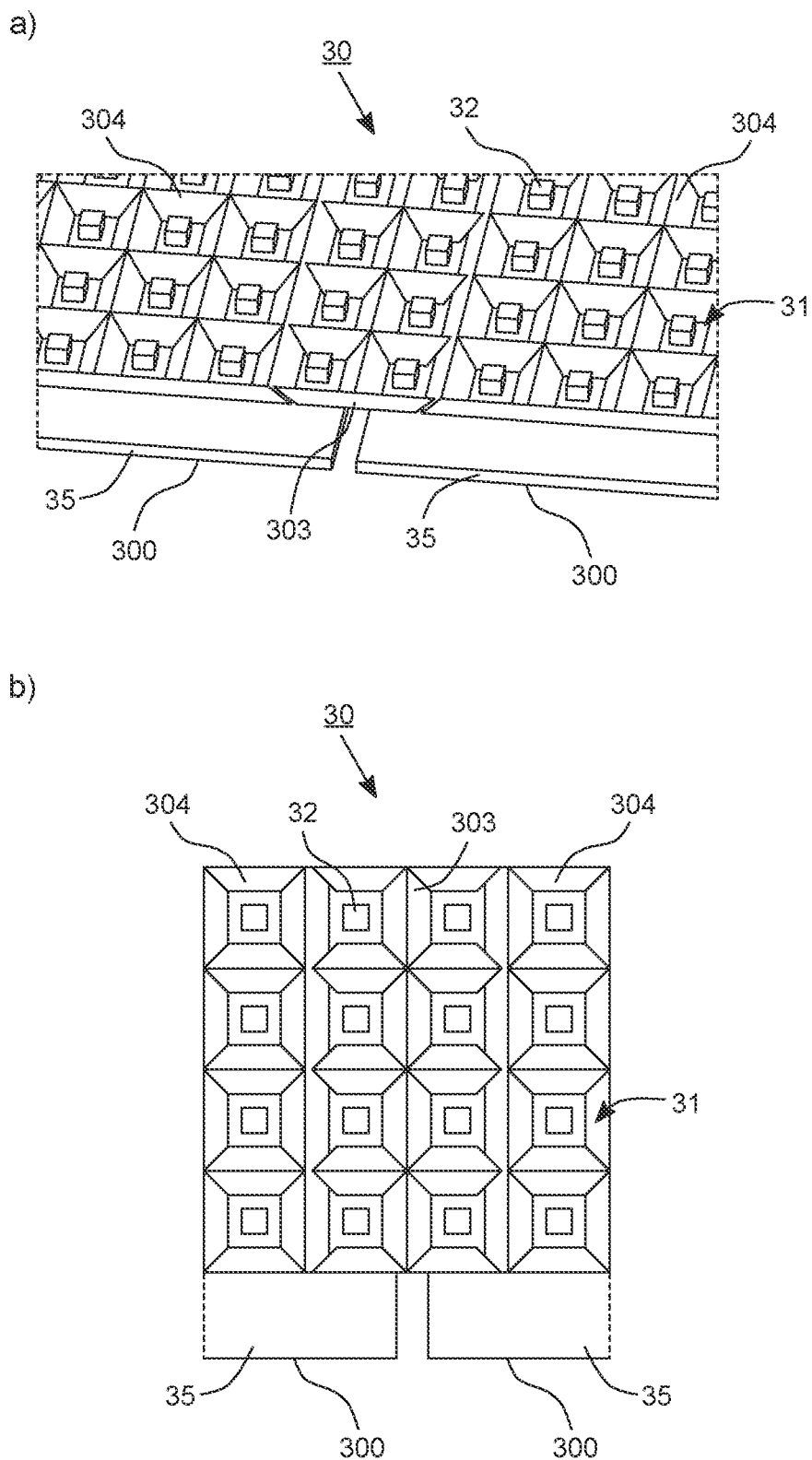
FIG. 6 schematically shows a fourth embodiment of a modular reflector.

FIG. 6 schematically shows a fourth embodiment of a modular reflector 30. FIG. 6a) here shows an oblique view of two modules 300 of the reflector 30. FIG. 6b) shows a top view. This embodiment of the modular reflector largely corresponds to the embodiment in FIG. 5. However, the compensation element 303 has a wider design, that is to say the width substantially corresponds to the width of two cavities 31.

Figure 7:
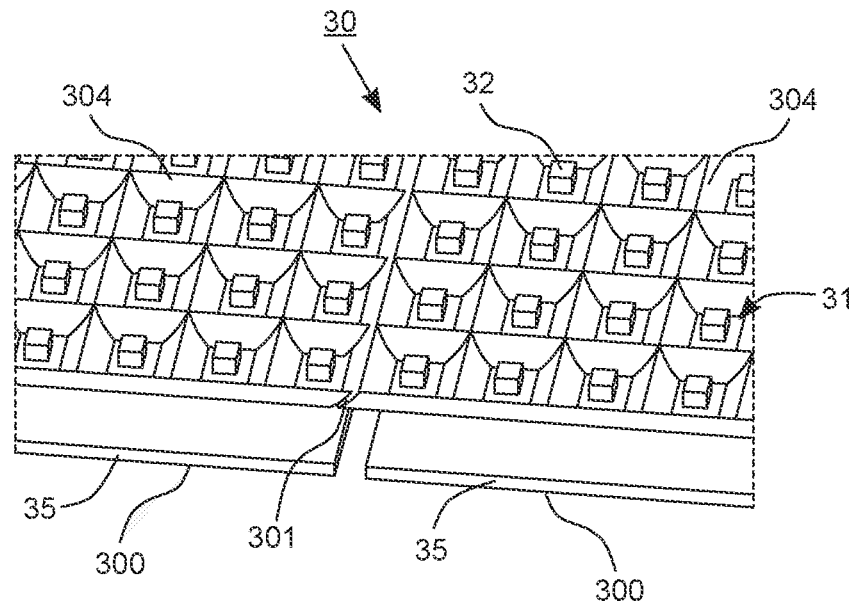
FIG. 7 schematically shows a fifth embodiment of a modular reflector.

FIG. 7 schematically shows a fifth embodiment of a modular reflector 30. It shows an oblique view of two modules 300 of the reflector 30. This embodiment of the modular reflector largely corresponds to the embodiment in FIG. 3. However, the walls 34 of the cavities 31 are rounded. The overlap of the reflector elements 304 is adapted to this rounding.

Figure 12:
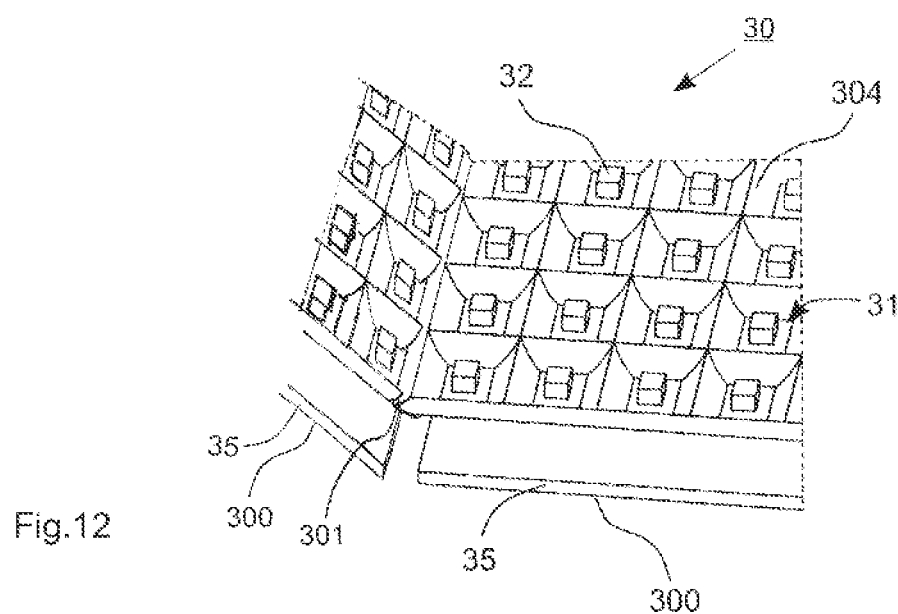
FIG. 12 shows a further embodiment of a modular reflector.

FIG. 12 shows a further embodiment of a modular reflector, similar to FIG. 7. However, in this case, the two circuit boards 35 shown are arranged such that they are tilted in relation to each other. The extent of this tilt is exaggerated in this Figure. The purpose of the tilt is to ensure the most uniform backlighting of a curved display panel 2 (not illustrated here). The peripheral region of a module 300 is shaped here such that even in its tilted arrangement it represents a complement to the reflector surface of the adjacent module 300 that is as complete as possible.

Figure 8:
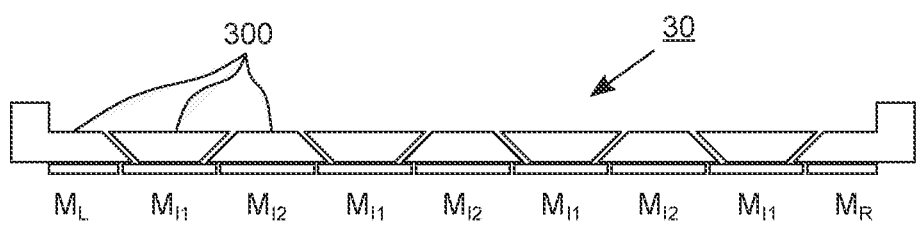
FIG. 8 schematically shows a modular reflector assembled from four different module types.

FIG. 8 schematically shows a modular reflector 30 assembled from four different module types. In the example illustrated, the reflector 30 consists of nine modules 300, which have four different shapes and therefore have to be produced with four different tools: the left-hand peripheral module $M_L$, two inner modules $M_{I1}$, $M_{I2}$, the right-hand peripheral module MR.

Figure 9:
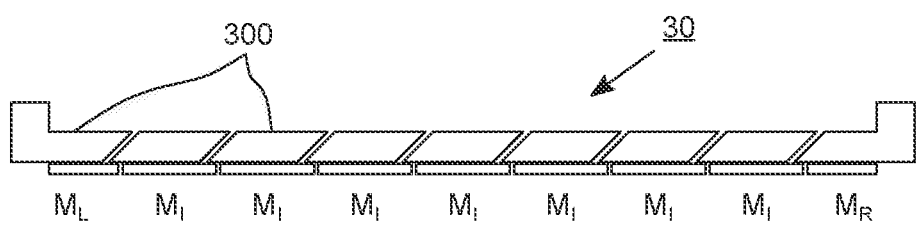
FIG. 9 schematically shows a modular reflector assembled from three different module types.

FIG. 9 schematically shows a modular reflector 30 assembled from three different module types. In this example, the reflector 30 also consists of nine modules 300, but these have only three different shapes and may therefore be produced with three different tools: the left-hand peripheral module $M_L$, the inner module $M_I$, the right-hand peripheral module MR.

Figure 10:
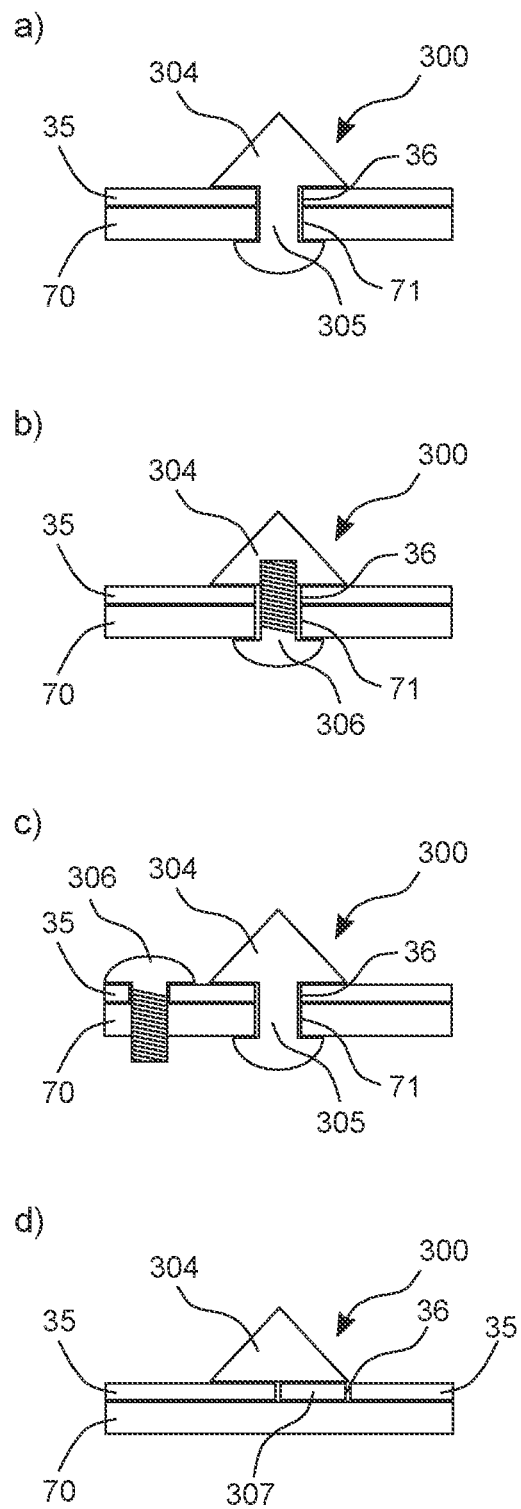
FIG. 10 shows possible ways of attaching the modules to a carrier element.

FIG. 10 shows possible ways of attaching the modules 300 to a carrier element 70. In FIG. 10a), the module 300 is riveted to the carrier element 70. For this purpose, the reflector element 304 has a rivet 305 extending through a cutout 36 in the circuit board 35 and a cutout 71 in the carrier element 70. The rivet 305 preferably consists of the material of the reflector element 304 so that it may be hot riveted in a simple manner. In FIG. 10b), the module 300 is screwed-connected to the carrier element 70. For this purpose, a screw 306 is screwed through a cutout 71 in the carrier element 70 and a cutout 36 in the circuit board 35 into the reflector element 304. FIG. 10c) shows an exemplary embodiment in which the reflector element 304 is riveted to the carrier element 70 and the circuit board 35 is additionally screw-connected to the carrier element 70. In FIG. 10d), the module 300 is adhesively bonded to the carrier element 70. For this purpose an adhesive tape 307 is used, which brings about an adhesive bond between the reflector element 304 and the carrier element 70. The adhesive tape 307 is arranged in a cutout 36 in the circuit board 35.

Figure 11:
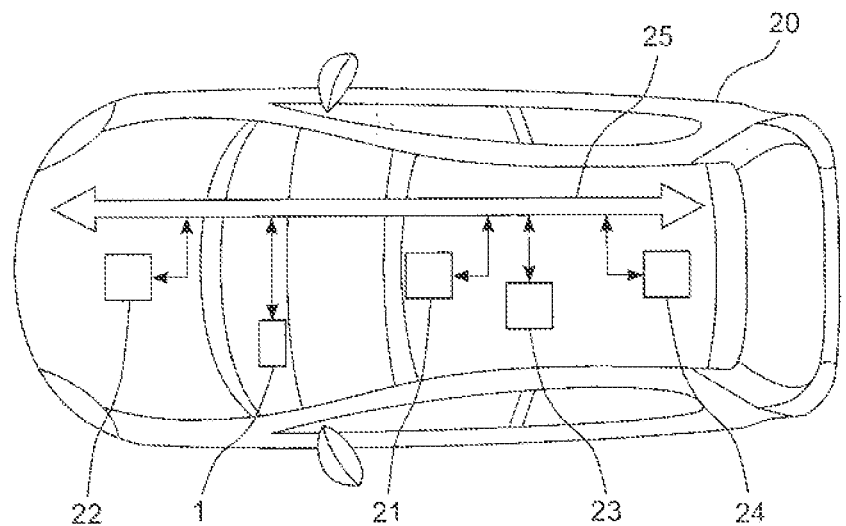
FIG. 11 schematically shows a means of transportation that utilizes a display apparatus according to the disclosure.

FIG. 11 schematically shows a means of transportation 20 that utilizes a display apparatus 1 according to the disclosure. The means of transportation 20 is a motor vehicle in this example. The motor vehicle has a display apparatus 1 according to the disclosure, which is disposed in a dashboard. Data on the vehicle's environment may be acquired by a sensor system 21. The sensor system 21 may in particular comprise surroundings recognition sensors, for example ultrasonic sensors, laser scanners, radar sensors, lidar sensors, or cameras. The information acquired by the sensor system 21 may be used to generate content to be displayed for the display apparatus 1. Further integral parts of the motor vehicle in this example are a navigation system 22, by which positional information may be provided, and also a data transmission unit 23. A connection to a back-end, for example for receiving updated software for components of the motor vehicle, may, for example, be established by means of the data transmission unit 23. A memory 24 is present for storing data. Data is exchanged between the various components of the motor vehicle via a network 25.

The invention claimed is:

1. A display apparatus comprising:
   a display panel; and
   a backlight for the display panel, the backlight comprising:
   a first module and a second module adjacent one another with each module having a reflector element, each reflector element having reflective walls defining a cavity,
   wherein at least one end of the first module and at least one end the second module have a respective open end absent a reflective wall portion,
   wherein provision is made between adjacent modules for thermal expansion of the modules, and
   wherein a compensation element is disposed between the first and second modules at the respective open ends, the compensation element being reflective to complement the reflector elements of the modules; and
   a light source arranged in each cavity.

2. The display apparatus as claimed in claim 1, wherein a free space is located between adjacent modules.

3. The display apparatus as claimed in claim 1, wherein the modules are connected to a carrier element by snapping, screwing, adhesive bonding or riveting.

4. The display apparatus as claimed in claim 1, wherein at least one of the modules has at least one energy-absorbing supporting element.

5. The display apparatus as claimed in claim 1, wherein the walls of are rounded and are designed to reflect the light emitted by the light source toward the display panel.

6. The display apparatus as claimed in claim 1, wherein the light sources arranged in the cavities of one module lie in one plane, and the arrangement of circuit boards and modules is adapted to be disposed at an angle with respect to one another.

7. A display apparatus comprising:
a display panel; and
a backlight for the display panel, the backlight comprising:
a first module and a second module adjacent one another with each module having a reflector element, each reflector element having reflective walls defining a cavity,
wherein at least one end of the first module has an open end absent a reflective wall portion,
wherein provision is made between adjacent modules for thermal expansion of the modules, and
wherein the open end of the first module is adjacent an end of the second module such that the end of the second module forms an end reflective wall of the open end of the first module, and
a light source arranged in each cavity,
wherein an elastic connecting element is located between adjacent modules.

8. A motor vehicle with a display apparatus comprising:
a display panel; and
a backlight for the display panel, the backlight comprising:
a first module and a second module adjacent one another with each module having a reflector element, each reflector element having reflective walls defining a cavity,
wherein at least one end of the first module and at least one end the second module have a respective open end absent a reflective wall portion,
wherein provision is made between adjacent modules for thermal expansion of the modules, and wherein a compensation element is disposed between the first and second modules at the respective open ends, the compensation element being reflective to complement the reflector elements of the modules; and
a light source arranged in each cavity.

* * * * *